United States Patent Office 2,975,150
Patented Mar. 14, 1961

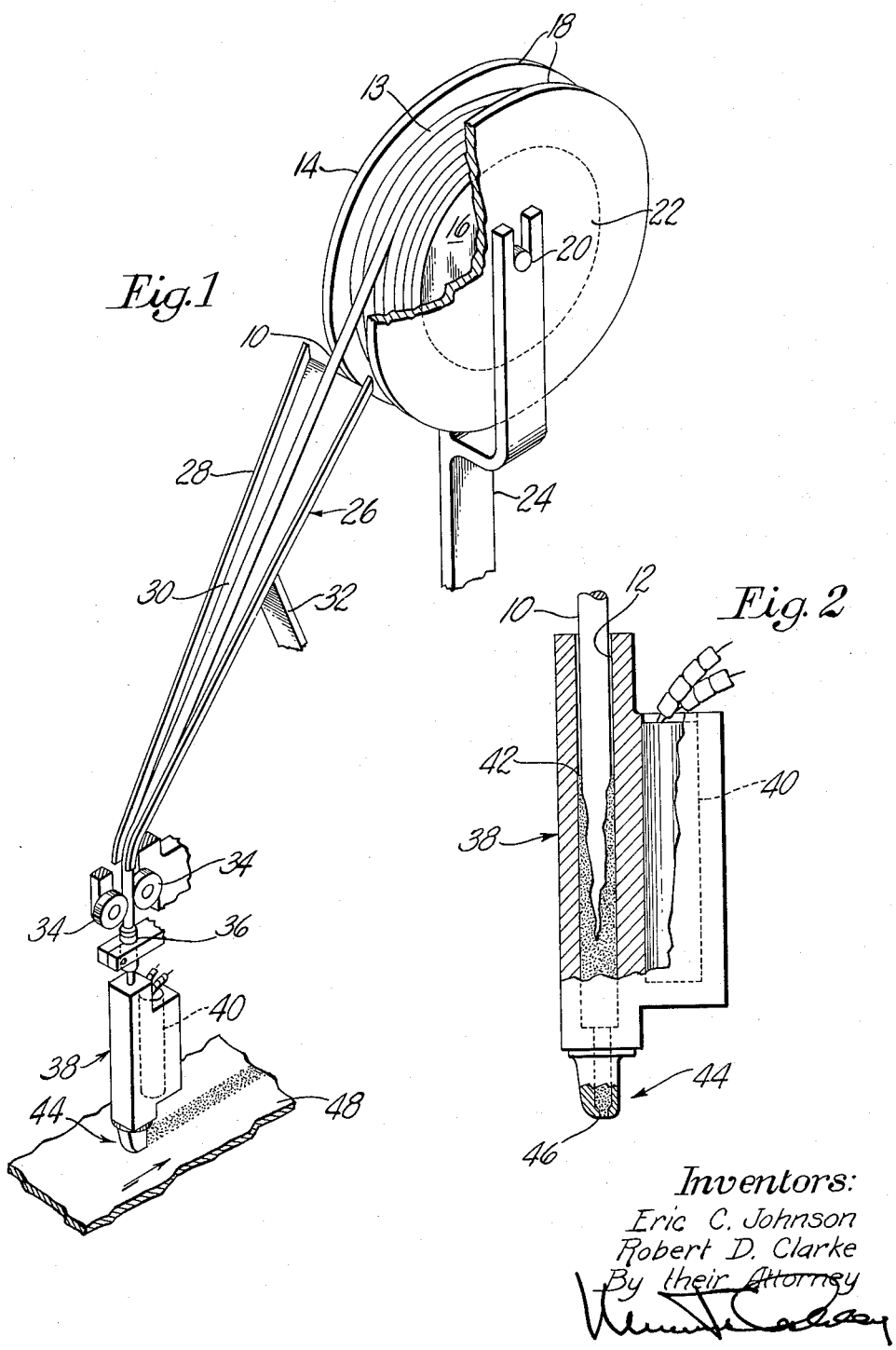
Inventors:
Eric C. Johnson
Robert D. Clarke
By their Attorney

2,975,150

THERMOPLASTIC ADHESIVE COMPOSITIONS AND SUPPLY ARTICLES

Eric C. Johnson and Robert D. Clarke, Somerville, Mass., assignors to B.B. Chemical Co., Boston, Mass., a corporation of Massachusetts Filed Jan. 14, 1959, Ser. No. 786,786

12 Claims. (Cl. 260—27)

This invention relates to a thermoplastic adhesive composition and supply article.

This application is a continuation-in-part of an application in the names of Eric C. Johnson and Robert D. Clarke, entitled "Thermoplastic Adhesive Compositions and Supply Articles," Serial No. 590,423, filed June 11, 1956, now abandoned.

It has become customary in the merchandising of foods such as bakery goods to provide cardboard trays into which the goods are placed and thereafter wrapped, for example in cellophane, before delivery to stores. Automatic machinery has been developed for forming and setting up the cardboard food trays, this equipment usually involving folding devices and a gravure roll type applicator for applying adhesive to hold the tray in formed condition. The machines have been designed to apply hot animal glue, the glue being melted in a glue pot and supplied to the applicator roll.

The glue pot operation has presented the undesirable factors of glue odor, mess and other common difficulties characteristic of using glue pots. Glue as an adhesive leaves much to be desired since it does not harden as rapidly as could be wished and the glue bond itself is subject to resoftening by heat, particularly by the moist heat encountered in use with bakery products. Nevertheless, because of cost elements and the necessity that no toxic ingredient be employed in food packages, no satisfactory substitute has been provided heretofore.

In the application of Thomas C. Morris and Eric C. Johnson (one of the present applicants), entitled "Thermoplastic Adhesive Rods or Strips," Serial No. 377,162, filed August 28, 1953, there is described a new adhesive article serving as a reservoir of adhesive and comprising a coil of uniform rod of thermoplastic adhesive. Among other properties the rod is sufficiently stiff to be fed longitudinally but adequately flexible to be coiled for storage and uncoiled for use in a direct through-feed adhesive dispensing system as needed without cracking. The rod adhesive eliminates the traditional glue pot type of adhesive reservoir and provides many advantages in the handling and using of adhesives.

It has been found that the normal adhesive rod while particularly effective in high speed operations may set up to a non-adhesive condition in too short a time for use with machines designed for use with conventional type adhesives such as glue.

It is a feature of the present invention to provide a new thermoplastic adhesive and adhesive supply article which will eliminate the messy, unsanitary glue pot and give improved bond forming characteristics.

According to the present invention there is provided a new thermoplastic adhesive preferably in the form of a slender flexible rod or strand composed of a mixture of resins which are miscible in molten condition but which are incompatible and separate when the molten resinous material is cooled to solid state. This adhesive retains for a short time after application to a surface in fluid condition its ability to form a bond to another surface.

Separation of the resinous materials on cooling requires that there be enough of each so that significant separation occurs as evidenced by development of a milky state in the solidified mixture. Manufacture of a slender rod having substantially uniform cross section is accomplished by melting the resinous materials together to a substantially homogeneous liquid, extruding the liquid as a rod and chilling the slender rod as by immersing it in water promptly after extrusion. The rapid cooling obtained by reason of the thin cross section and cooling water prevents coarse separation of the incompatible resinous materials and provides an article, successive portions of which can be reduced rapidly to molten condition, the molten material having the same relative proportions of the resinous materials present in the initial mixture.

Selection of resins for combination in this adhesive depends upon two physical properties. In molden condition the resins must be soluble one in the other to form a substantially homogeneous liquid. Secondly, the resinous materials in the proportions used must be at least partially incompatible with each other in solid condition so that the resins separate to some extent as evidenced by development of a cloudy or milky appearance when a molten solution of the materials is cooled to solidify it. These properties are known for many combinations of resins; but with respect to any combination of resins, determining whether the combination possesses these two physical characteristics is readily done.

Choice of combinations of heat fusible components which are compatible in molten condition but incompatible when cooled to solid condition is a matter within the skill of persons versed in the art as evidenced by the patent to Wiswell 2,608,543, issued August 26, 1952. In contrast to the pressure sensitive adhesive composition of Wiswell, however, it is not important that any component of the present mixture be a crystalline plasticizer; but it is important that the components of the present mixture be selected and proportioned to insure that the composition is a non-tacky solid before it reaches room temperature. The present composition does not rely on separation of the components to effect a transition from tacky to a non-tacky condition but is cooled down through and below the temperature range where separation occurs. The solution has a melting point lower than at least one of its components and hence the molten adhesive when applied remains in bond-forming condition down to a lower temperature and has a longer open time. It should be noted that the extended open time referred to is ordinarily a matter of a fraction of a second to at most a few seconds. At least partial separation of the components occurs in the course of cooling to give a hard strong bond. The separation of components may operate to give this bond by one or both of the following mechanisms. The separated material may provide a reinforcing filler action and/or the separation of the component if a softener or plasticizer may leave the remaining material harder and stronger because of a reduced effective plasticizer content.

A preferred adhesive comprises in certain ranges of relative proportions polyethylene, polyvinyl acetate and a hydrocarbon resin having at elevated temperatures at least limited solvent power towards the polyethylene. In a preferred embodiment the thermoplastic adhesive is supplied as a reservoir comprising a coil having a plurality of turns of uniform rod which is sufficiently stiff to be fed longitudinally but adequately flexible to be coiled for storage and uncoiled for use in a direct through-feed adhesive dispensing system as needed without cracking.

The invention will be described further in connection with the accompanying drawings forming part of the disclosure in which, Fig. 1 is an angular view of the adhesive supply and control rod in coil form with a portion uncoiled and inserted into a passageway of a device for softening and dispensing the adhesive; and Fig. 2 is a view with parts broken away of the adhesive rod disposed as a piston in a complementary passageway showing the cooperative relation between the body of solid adhesive and the walls of the passageway for controlling flow of adhesive through the passageway to the point of application.

As shown in Fig. 1 the thermoplastic adhesive rod 10 for direct through-feed adhesive dispensing is an elongated self-supporting body of solid, thermoplastic adhesive having a substantially uniform gross cross section complementary to the cross section of the entrance to the heated softening and dispensing passageway 12. The solid self-supporting rod 10 is shown coiled in overlapping layers 13 on a spool 14 from which it is fed to the melting and dispensing passageway 12. The spool 14 comprises a relatively large diameter hub member 16 and side flanges 18 and is rotatably mounted on a supporting shaft 20 which is fitted in the slotted upper ends 22 of a bifurcated supporting bracket 24. The adhesive rod 10, after it is uncoiled from the spool, passes through a trough 26 having side walls 28 and a bottom wall 30 supported by a post 32 and into the bite of toothed or notched feed rolls 34 which firmly grip it for applying axial pressure to the rod 10. From the feed rolls 34 the rod 10 passes through a guide bushing 36 and into the entry end of the passageway 12 in the heating and applying member.

As shown in Fig. 2, the passageway 12 comprises a body portion 38 in one side of which is disposed a heating element 40 to supply heat through the body portion 38 to the passageway 12. The adhesive rod 10 effectively fills the entrance portion of the passageway 12, any slight gap between the rod 10 and the walls of the passageway 12 being sealed by softened or molten material 42. When moved forward the rod 10 bears uniformly against the full cross section of adhesive whether incompletely or wholly in fluid form in the forward portions of the passageway. The uniform bearing of the rod against the entire cross section of adhesive in the passageway insures orderly progress of adhesive through the passageway which constitutes an important advantage of direct through-feed adhesive dispensing.

The effective seal between the solid rod and the walls of the passageway creates a relation between them such that the rod 10 moves into the passageway 12 at the same time that an equivalent volume of heat softened adhesive leaves the dispensing end 44 of the passageway 12 through opening 46 and is spread on a work piece 48 moving beneath it. When movement of the rod 10 is halted it aids in retaining softened adhesive within the passageway 12. Thus the rod 10 serves as a supply and/or control member in the direct through-feed adhesive dispensing system shown and gives particularly advantageous operational characteristics when the system is used in combination with automatic or semi-automatic machines. To function as such control it is important that the rod have an indefinite length and that the rod be capable of being uncoiled from the spool or reel 14 without cracking. It is necessary that the rod in the coil retain its cross section substantially unchanged on storage and that it not adhere to adjacent coils in order that the rod may be uncoiled from the spool in a cross sectional shape complementary to the cross sectional shape of the passageway 12.

Other through-feed adhesive dispensing and applying equipment, for example that shown in the application of Eric C. Johnson (one of the present applicants) entitled "Supply Bodies and Methods for Softening and Dispensing Heat Softenable Mixtures," Serial No. 539,770, filed October 11, 1955, or in the U.S. Patent to H. C. Paulsen No. 2,726,629, issued December 13, 1955, entitled "Mechanisms for Applying Rod Cement" may be used in place of that shown in the drawings.

The present adhesive rod or strip is a combination of resins miscible in molten condition but incompatible in solid state. The resin components are selected and combined in proportions such that the adhesive in molten condition has a viscosity and surface character enabling it to be supplied to the applicator roll and to be deposited on the surfaces to be bonded. The deposited adhesive material retains for a short but appreciable time the ability to establish a bond when portions of the article to be bonded are brought together. This retention of bonding ability, referred to in the trade as "open time," is an important element fitting the adhesive for use in the equipment developed for making food containers.

Many combinations of resins are known in which the resins are miscible in molten condition to form a homogeneous liquid but in which the resins are incompatible and separate when the molten material is cooled to solidify it. A preferred mixture (1) comprises polyethylene, polyvinyl acetate and a hydrocarbon resin having at elevated temperatures at least limited solvent power towards the polyethylene. Other combinations which applicants have found useful as adhesives include (2) mixtures of from 2 to 10 parts of polyethylene and 10 to 15 parts of polymerized rosin with from 60 to 75 parts of polyamide resin which has been reacted with epoxide resin insufficient to cure it; (3) mixtures of from 10 to 20 parts of low molecular weight polymers of styrene and styrene homologs with from 60 to 75 parts of polyamide resin which has been reacted with epoxide resin insufficient to cure it; (4) mixtures of from 25 to 40 parts of polyethylene, from 25 to 40 parts of a hydrocarbon resin having at elevated temperatures at least limited solvent power toward polyethylene and from 5 to 30 parts of a copolymer of about 98% isobutylene and about 2% of a diene such as isoprene with from 10 to 25 parts of tri(-p-tertiary-butyl phenyl) phosphate; (5) mixtures of from 25 to 40 parts of polyethylene, from 30 to 40 parts of a hydrocarbon resin having at elevated temperatures at least limited solvent power toward polyethylene and from 5 to 30 parts of a copolymer of about 98% isobutylene and about 2% of a diene such as isoprene with from 2 to 10 parts of a polyamide; and (6) mixtures of from 25 to 40 parts of polyethylene, from 15 to 35 parts of a hydrocarbon resin having at elevated temperatures at least limited solvent power toward polyethylene and from 5 to 25 parts of polyisobutylene with from 5 to 35 parts of a polyester such as polyethylene terephthalate. The parts referred to in the foregoing list of mixtures are parts by weight. In the preferred mixture (1), the polyvinyl acetate is incompatible with and separates from the remaining components in solid condition. In the remaining mixtures, in mixture (2) the polyamide resin separates from the remaining components. In mixture (3) the polyamide resin separates from the remaining components. In mixture (4) the tri(-p-tertiary-butyl phenyl) phosphate separates from the remaining components. In mixture (5) the polyamide separates from the remaining components and in mixture (6) the polyester separates from the remaining components.

United States Letters Patent No. 2,894,925, which issued July 14, 1959, on an application Serial No. 439,122, filed June 24, 1954, in the names of Thomas C. Morris and Eric C. Johnson, contains a further discussion on the relation of polyethylene and hydrocarbon resin having at elevated temperatures at least limited solvent power toward polyethylene. United States Letters Patent No.

2,867,592, which issued January 6, 1952, on an application Serial No. 428,304, filed May 7, 1954, in the names of Thomas C. Morris and Adolph M. Chaplick, contains a further discussion on the combination of polyamide resin and epoxy resin. The disclosure of these patents is incorporated by reference.

It is a peculiar characteristic of the combination of the polyvinyl acetate with the polyethylene and hydrocarbon resin that notwithstanding the relatively long open time, the adhesive has high resistance to "cold flow." The relative proportions of the various components are important to secure this new action. Polyvinyl acetate has been considered incompatible with polyethylene compositions and it is a fact that in solidified mixture of the present invention the material has a milky look characteristic of incompatibility. Surprisingly, in the proportions in which combined, the adhesive mixture when in molten state is clear and colorless. Although applicant does not wish to be bound by the following theory, it is believed that the incompatibility in solid form introduces a delay into the setting up or loss of bonding ability which gives the desired relatively long open time.

On the other hand, where the preferred adhesive composition is to be employed in rod form, any substantial departure from the ranges given will interfere with the desired flexibility, freedom from brittleness, etc. of the rod which are important to successful use of the rod in a direct through-feed cement dispensing and applying system.

The polyethylene component of the adhesive composition is a relatively high molecular weight of polyethylene, i.e., a resinous polyethylene as distinguished from a wax or grease. It is preferred to employ polyethylene materials having molecular weights in the range of from about 7,000 to about 21,000 as determined by viscometric means using a solution of the polyethylene in tetralin at 130° C. and calculating the molecular weight by the following equation:

$$M = \frac{K_{cm} \log_{10} nr}{C}$$

where M equals weight average molecular weight, $nr$ equals relative viscosity, C equals base molar concentration of polymer in tetralin at temperature of determination equals 4.0 gms. per liter at 130° C. and $K_{cm}$ equals $4.03 \times 10^4$ gms. per liter of solution at 130° C. In the composition it appears that the polyethylene is fluxed and dissolved by the hydrocarbon resin and that by its presence in the hydrocarbon resin it controls the solvent power of the resin. In the solidified adhesive it appears also to serve as a reinforcing filler to reduce cold flow.

A preferred hydrocarbon resin is a polyterpene resin, and specifically a B-pinene polymer such as that sold under the trademark "Piccolyte." This polymeric material is made in a wide range of melting points, the preferred polymers being those having a melting point of 85° to 135° C. This material exerts in molten form substantial solvent action on the polyethylene resin. Other hydrocarbon resins which possess substantial solvent action in molten condition include resinous polymerization products obtained by catalytic polymerization of mixed unsaturated monomers derived from cracked petroleum including the commercially available materials known as "Piccopale" and "Kenflex A" and fossil resinous materials such as the commercial resin known as "RBH510" which is understood to be the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C., and the commercial material known as Solarite #64, which consists essentially of carbon and hydrogen, has an acid number of 2, a specific gravity of 1.01 to 1.02, and a melting point of 195° to 205° C.

Polyvinyl acetate of softening point in the range of about 75° C. to 200° C. may be used. Commercially available polyvinyl acetate resin such as Gelva 15 and the "Vinylite" polyvinyl acetate resins such as AYAT in the same softening range may be used.

These preferred adhesive compositions will comprise from about 5% to about 20%, preferably from 10% to 15%, by weight of polyvinyl acetate, from about 15% to about 45%, preferably 20% to 30%, of the hydrocarbon resin having at elevated temperatures at least limited solvent power toward the polyethyene, and from about 45% to about 70%, preferably 50% to 60%, polyethylene.

The mixture is prepared by melting the materials together. Ordinarily, the hydrocarbon resin will be placed in the melting pot first and when it is melted the polyvinyl acetate, an antioxidant, and finally the polyethylene are added. When melting is complete, the mixture is extruded as a continuous rod of uniform cross section. The rod will normally have a cross section of about 1/8" to about 1/4" in thickness and the extrusion temperature will be chosen to be about 5° to 20° C. above the temperature at which the mixture becomes a flowable liquid. The extruded material is cooled in a water bath promptly after extrusion and is firmly wound on a reel or core. Preferably, the minimum diameter of the core or reel about which the rod is wound will be 3".

The following examples are given to aid in understanding the invention and it is to be understood that the invention is not restricted to the materials or proportions of the examples:

Example I

Into a kettle heated to about 300° F. there were introduced 28.5 parts by weight of a poly B-pinene resin having a melting point of 125° C. When this material had melted, there were added 14 parts by weight of polyvinyl acetate having a softening point of 131° C., and 2 parts by weight of a commercial antioxidant. Thereafter 56.5 parts by weight of polyethylene (DYLT) having a molecular weight of 18,000 was added and the mixture stirred to form a clear colorless liquid. The liquid was cooled and sheeted out. The sheeted material was extruded in a worm type extruder at 200° F. as a 1/4" rod and was firmly coiled on a reel of which the core had a diameter of 3".

The rod was fed from the reel to a through-feed dispensing and applying device associated with a cardboard food tray folding and setting up machine (not shown) to apply molten adhesive to the overlapping portions of food trap blanks. A temperature of 315° to 325° F. was maintained in the dispensing and applying device. The device and associated machine operated effectively to fold and adhesively bond form as few as 12 to as many as 100 trays per minute. The completed trays were filled with freshly baked rolls and wrapped in a regenerated cellulose film which was heat sealed at the ends. No difficulty was encountered in forming and loading the trays and none of the adhesive joints of the trays opened in subsequent handling.

Example II

| | Parts by weight, grams |
|---|---|
| Polyamide A | 67.31 |
| Polyamide B | 3.85 |
| Plasticizer | 9.6 |
| Epoxide resin | 1.92 |
| Polymerized rosin acid | 13.46 |
| Polyethylene DYLT | 3.85 |

The above polyamide resins are the reaction products of polymerized fatty acid from soybean oil with ethylene diamine. Polyamide Resin A has an acid number of about 7, an ash content of 0.10 maximum, a specific gravity of .917, an average molecular weight of 3000 to 6500 and a ball and ring softening point (ASTM) of 105° to 115° C. Polyamide Resin B has an acid number of not over 12, an ash content of 0.10 maximum, a specific gravity of 0.987, an average molecular weight of 3000 to 6500 and a ball and ring softening point (ASTM) of at least 43° C.

The epoxy resin is the diglycidyl ether made by reacting two mols of epichlorhydrin per mol of diphenylol propane and may be prepared by a procedure similar to that outlined in column 5, lines 6 to 48, of U.S. Patent No. 2,506,486 to Bender et al., granted May 2, 1950. The resin has a viscosity of 25° C. of from 9000 to 17,000, an epoxy equivalent value of 185 to 200 grams per gram mol epoxy, a maximum of 0.2% hydrolyzable chlorine and a specific gravity of 1.15 to 1.17.

The plasticizer used is a mixture of ortho and para N-ethyl toluene sulfonamides.

The polymerized rosin material is derived by polymerization of unsaturated acids from rosin including pimaric acid and abietic acid. It has an acid number of 150 to 156, a saponification number of 157 to 163 and a melting point of 100.5° C.

Into a kettle heated to about 300° F. there were introduced the Polyamide A, the Polyamide B and the polymerized rosin acid. These materials were melted to a uniform liquid with stirring and the epoxy resin was introduced into the kettle and stirred in. The mixture was held at 300° F. for about 30 minutes and the polyethylene material was introduced and mixed in. After the polyethylene had been dissolved, the plasticizer was added and the mixture stirred to form a clear liquid. A ¼ inch rod was formed from the mixture by the procedure of Example I. The resultant rod was milky in appearance indicating incompatibility of the polyamide and the polyethylene material in solid condition. The rod was used for bonding cardboard trays for food packages. Application temperature was 315° F.

*Example III*

| | Parts by weight, grams |
|---|---|
| Polyamide Resin C | 672 |
| Polyamide Resin B | 38.4 |
| Plasticizer liquid | 98.4 |
| Epoxide resin | 16.8 |
| Low molecular weight polymer of styrene and styrene homologs | 134.4 |

The Polyamide Resin C is the reaction product of dimerized fatty acid from soybean oil with ethylene diamine. The resin has a viscosity at 25° C. of 65 to 100 centipoises, an acid number of 7, a ball and ring softening point (ASTM) of 100° to 115° C., an average molecular weight of from 6000 to 9000 and a specific gravity of 0.97 to 0.99.

The polymer of styrene and styrene homologs is the material formed by polymerization of the crude mixture of styrene and styrene homologs obtained from the fractionation of "crude solvent" from "light oils" scrubbed out of coke oven or gas house gas. The material has a melting point ball and ring (ASTM) of 100° C. and has a molecular weight (weight average molecular weight) not exceeding 25,000. The material has a density at 20° C. of from 1.03 to 1.06 and a melt viscosity at 180° C. using a number 4 spindle of 1535 centipoises, and has a limited compatibility with polyamide resins.

Into a kettle heated to about 300° F. there were introduced first the polyamide resins. When these materials had melted to a uniform liquid the epoxy resin was introduced and mixed in thoroughly. The mixture was held at this temperature for about thirty minutes with agitation. The polystyrene material was then mixed in and finally the plasticizers were added and mixed in. The mixture was cooled and sheeted out thin. Strips of the sheeted out material were extruded as a ¼" thickness rod at 205° F. The extruded rod was cooled promptly by immersion in water. The resultant rod was milky in appearance indicating incompatibility of the polyamide and the polystyrene material in solid condition. The rod was used in a direct through feed adhesive melting and applying device for bonding cardboard trays for food packages. Application temperature was 315° F.

*Example IV*

| | Parts by weight, grams |
|---|---|
| Polyethylene DYLT | 31.3 |
| Polybeta-pinene (melting point 85° C.) | 15.7 |
| Butyl rubber GRI-17 | 15.7 |
| Kenflex A (hydrocarbon resin) | 15.7 |
| Tri(-p-tertiary-butyl, phenyl)phosphate, a white crystalline solid having a melting point of 95–99.5° | 20 |
| Antioxidant | 1.5 |

Butyl rubber is a copolymer of about 98% isobutylene and about 2% of a diene ordinarily isoprene.

Kenflex A is a polymer of an unsaturated monomer fraction separated from deep cracked petroleum. The resin has a softening point (ball and ring) of approximately 100° C., a specific gravity at 25° C. of from 0.970 to 0.975, a refractive index at 20° C. of 1.5116, an acid number less than 1, an iodine value (Wijs) of 120, a bromine number of 7.3 and a molecular weight of approximately 1100.

Into a Werner-Pfleiderer mixer heated to about 300° F. there were introduced first the polybeta-pinene resin and the hydrocarbon resin and when this material was melted the butyl rubber was added and pulled in without further heating. The temperature of the mixer was then brought to 300° F. and the antioxidant and the polyethylene mixed in to form a homogeneous liquid. Thereafter the tri(-p-tertiary-butyl, phenyl)phosphate was added and the mixture stirred to form a clear liquid. The liquid was cooled and sheeted out between rolls. The sheeted material was cut into strips which were fed into a worm type extruder and extruded at 175° F. as a ¼" thickness rod. The rod was fed to a through feed dispensing and applying device and applied for bonding paper to paper. Application temperature was about 350° F.

*Example V*

| | Parts by weight |
|---|---|
| Polybeta-pinene (melting point 125° C.) | 38.21 |
| Butyl rubber | 24.51 |
| Polyethylene DYLT | 29.41 |
| Polyamide A | 5.91 |
| Antioxidant | 1.96 |

The polybeta-pinene was introduced into a Werner-Pfleiderer mixer heated to about 300° F. and thereafter the copolymer of isobutylene and isoprene was added and pulled in. The polyamide was then added and mixed in. Thereafter the antioxidant and the polyethylene were added and mixed in. The mixture in molten condition was a clear liquid. The adhesive was cooled and sheeted out and the sheeted material was fed as strips to a worm type extruder operating at a temperature of 200° F. The material was extruded as a ¼" rod which was cooled by prompt immersion into a bath of water. The rod was of milky appearance indicating a separation of components within the solidified mass. This adhesive was useful in a direct through feed dispensing and applying device for bonding paper. Application temperature was about 350° F.

*Example VI*

| | Parts by weight |
|---|---|
| Polyethylene DYLT | 29.7 |
| Multron F-38 (polyester) | 28 |
| Vistanex L-80 (polyisobutylene) | 14.8 |
| Polybeta-pinene (melting point 125° C.) | 26.5 |
| Antioxidant | 1 |

Multron F-38 is a polyester resin understood to be polyethylene terephthalate having a hydroxyl number of from 150 to 250, an acid number of less than one and a solidification point of from 85° to 90° C.

The polybeta-pinene resin was introduced into a Werner-Pfleiderer mixer heated to about 300° F. After melting the resin, the polyisobutylene was added and pulled in. Thereafter the polyester material was added to the molten mixture and mixed in. The antioxidant and polyethylene were then added and mixed in. The material was cooled, sheeted out, cut into strips and extruded at 215° F. as a ¼" rod which was promptly cooled by immersion in water. The product was a milky flexible rod useful for the bonding of commercial polyester sheet material (Mylar). Application temperature was 375° F.

Having thus described our invention, what we claim as new and desire to secure by Letters Patent of the United States is:

1. As a new article of manufacture a solid rod of a resinous thermoplastic mixture of adhesive components heretofore considered incompatible with each other comprising a milky appearing dispersion of solid particles of one component distributed in a continuous solid phase of a second component, said mixture of components when at elevated temperature being a clear viscous liquid, the proportion of one component relative to the other being sufficiently high that on cooling it separates to develop said milky state in the solidified mixture, and said rod having a cross section of about ⅛" to about ¼" in thickness, and being sufficiently rigid to be fed longitudinally but adequately flexible to be coiled.

2. A thermoplastic adhesive composition comprising an intimate mixture of from 45% to 70% by weight of polyethylene having a molecular weight in the range of about 7,000 to about 21,000, from 15% to 45% by weight of a hydrocarbon resin, said resin being selected from the group consisting of hydrocarbon thermoplastic polyterpene resins having a softening point of 85° C. to 125° C., the resin separated from Utah type resin-bearing coal which consists essentially of carbon and hydrogen, has an average molecular weight of about 1000, a refractive index of 1.544, a specific gravity of from 1.03 to 1.06 and a melting point of from 165° to 180° C. and the resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximtaely 1100 having at elevated temperatures at least limited solvent power toward the polyethylene, and from 5% to 20% by weight of polyvinyl acetate having a softening point in the range of about 75° C. to 200° C., the components of said adhesive forming a uniform solution in the molten state and said adhesive retaining for a short but appreciable time after application in fluid condition to a surface its ability to form a bond to another surface.

3. A compact store of solid thermoplastic adhesive reducible progressively by heat to a fluid condition in quantities as needed for use in a direct through-feed industrial cement applying and dispensing system, and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 45% to 70% by weight of polyethylene having a molecular weight in the range of about 7,000 to about 21,000, from 15% to 45% by weight of at least one member of the group consisting of hydrocarbon thermoplastic polyterpene resins having a softening point of 85° C. to 125° C., the resin separated from Utah type resin-bearing coal which consists essentially of carbon and hydrogen, has an average molecular weight of about 1000, a refractive index of 1.544, a specific gravity of from 1.03 to 1.06 and a melting point of from 165° to 180° C. and the resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximately 1100, and from 5% to 20% by weight of polyvinyl acetate having a softening point in the range of about 75° C. to 200° C., the physical properties of said rod including the characteristics that said rod is self supporting, dry, and sufficiently stiff to be fed longitudinally but adequately flexible to be coiled for storage and uncoiled for use as needed without cracking.

4. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 45% to 70% by weight of polyethylene having a molecular weight in the range of about 7,000 to about 21,000, from 15% to 45% by weight of a hydrocarbon thermoplastic terpene polymer resin having a melting point of 85° C. to 125° C. and from 5% to 20% by weight of polyvinyl acetate having a softening point of from 75° C. to 200° C., the physical properties of said rod including the characteristics that said rod is self supporting, dry, and sufficiently stiff to be fed longitudinally but adequately flexible to be coiled for storage and uncoiled for use as needed without cracking.

5. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 50% to 60% by weight of polyethylene having a molecular weight in the range of about 7,000 to about 21,000, from 20% to 30% by weight of a polymer of B-pinene having a melting point of from 40° to 125° C. and from 10% to 15% by weight of polyvinyl acetate having a softening point of from 75° to 200° C., the physical properties of said rod including the characteristics that said rod is self supporting, dry, and sufficiently stiff to be fed longitudinally but adequately flexible to be coiled for storage and uncoiled for use as needed without cracking.

6. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 45% to 70% by weight of polyethylene having a molecular weight in the range of about 7,000 to about 21,000, from 15% to 45% by weight of a resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximately 1100 and from 5% to 20% by weight of polyvinyl acetate having a softening point of from 75° C. to 200° C., the physical properties of said rod including the characteristics that said rod is self supporting, dry, and sufficiently stiff to be fed longitudinally but adequately flexible to be coiled for storage and uncoiled for use as needed without cracking.

7. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 45% to 70% by weight of polyethylene having a molecular weight in the range of about 7,000 to about 21,000, from 15% to 45% by weight of the resin separated from Utah resin-bearing coal which consists essentially of carbon and hydrogen, has an average molecular weight of about 1000, a refractive index of 1.544, a specific gravity of from 1.03 to 1.06 and a melting point of from 165° to 180° C. and from 5% to 20% by weight of polyvinyl acetate having a softening point of 75° C. to 200° C., the physical properties of said rod including the characteristics that said rod is self supporting, dry, and sufficiently stiff to be fed longitudinally but adequately flexible to be coiled for storage and uncoiled for use as needed without cracking.

8. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 2 to 10 parts by weight of polyethylene having a molecular weight in the range of about 7,000 to about 21,000 and 10 to 15 parts by weight of polymerized rosin with from 60 to 75 parts by weight of polyamide resin which has been reacted with epoxide resin insufficient to cure it, the physical properties of said rod including the characteristics that said rod is self supporting, dry, and sufficiently stiff to be fed longitudinally but adequately flexible to be coiled for storage and uncoiled for use as needed without cracking.

9. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from 10 to 20 parts by weight of low molecular weight polymers of styrene and styrene homologs with from 60 to 75 parts by weight of polyamide resin which has been reacted with epoxide resin insufficient to cure it, the physical properties of said rod including the characteristics that said rod is self supporting, dry, and sufficiently stiff to be fed longitudinally but adequately flexible to be coiled for storage and uncoiled for use as needed without cracking.

10. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from about 25 to about 40 parts by weight of polyethylene having a molecular weight in the range of about 7,000 to about 21,000, from about 25 to about 40 parts by weight of at least one hydrocarbon resin from the group consisting of hydrocarbon thermoplastic polyterpene resins having a softening point of 85° C. to 125° C., the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C. and the resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximately 1100, and from about 5 to about 30 parts by weight of a copolymer of about 98% isobutylene and about 2% of a diene with from about 10 to about 25 parts by weight of tri(-p-tertiary-butyl phenyl) phosphate, the physical properties of said rod including the characteristics that said rod is self supporting, dry, and sufficiently stiff to be fed longitudinally but adequately flexible to be coiled for storage and uncoiled for use as needed without cracking.

11. A compact store of solid thermoplastic adhesive reducible progressively by heat to a fluid condition in quantities as needed for use in a direct through-feed industrial cement applying and dispensing system and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from about 25 to about 40 parts by weight of polyethylene having a molecular weight in the range of about 7,000 to about 21,000, from about 30 to about 40 parts by weight of at least one hydrocarbon resin from the group consisting of hydrocarbon thermoplastic polyterpene resins having a softening point of 85° C. to 125° C., the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C. and the resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximately 1100, and from about 5 parts to about 30 parts by weight of a copolymer of about 98% isobutylene and about 2% of a diene with from about 2 to about 10 parts by weight of a polyamide resin, the physical properties of said rod including the characteristics that said rod is self-supporting, dry, and sufficiently stiff to be fed longitudinally but adequately flexible to be coiled for storage and uncoiled for use as needed without cracking.

12. A compact store of solid thermoplastic adhesive reducible progressively by heat to a fluid condition in quantities as needed for use in a direct through-feed industrial cement applying and dispensing system, and said adhesive retaining for a short but appreciable time after application in fluid condition to a surface its ability to form a bond to another surface, said store comprising a coil having a plurality of turns of slender uniform rod composed of thermoplastic adhesive cement, said cement comprising an intimate mixture of from about 25 to about 40 parts by weight of polyethylene having a molecular weight in the range of about 7,000 to about 21,000, from about 15 to about 35 parts by weight of at least one hydrocarbon resin from the group consisting of hydrocarbon thermoplastic polyterpene resins having a softening point of 85° C. to 125° C., the resin separated from Utah type resin-bearing coal which consists essentially of carbon and hydrogen, has an average molecular weight of about 1000, a refractive index of 1.544, a specific gravity of from 1.03 to 1.06 and a melting point of from 165° to 180° C. and the resinous polymerization product obtained by catalytic polymerization of a mixture of unsaturated monomers derived by deep cracking petroleum and having a softening point (B.R.) of approximately 100° C., a specific gravity at 25° C. of 0.970 to 0.975, a refractive index at 20° C. of 1.5116, an acid number less than one, an iodine value (Wijs) of 120, a bromine number of 7.3 and a molecular weight of approximately 1100, and from about 5 to about 25 parts by weight of polyisobutylene with from about 5 to about 35 parts by weight of a polyester resin, the physical properties of said rod including the characteristics that said rod is self supporting, dry, and sufficiently stiff to be fed longitudinally but adequately flexible to be coiled for storage and uncoiled for use as needed without cracking.

References Cited in the file of this patent
UNITED STATES PATENTS

| | | |
|---|---|---|
| 2,220,545 | Reinhardt | Nov. 5, 1940 |
| 2,435,412 | Soday | Feb. 3, 1948 |
| 2,772,247 | Schroeder | Nov. 27, 1956 |
| 2,894,925 | Morris et al. | July 14, 1959 |

OTHER REFERENCES

Modern Plastics, December 1955, vol. 33, No. 4, page 240.